United States Patent [19]

Potzick

[11] Patent Number: 5,568,993
[45] Date of Patent: Oct. 29, 1996

[54] STRUT STRUCTURE AND RIGID JOINT THEREFOR

[75] Inventor: James E. Potzick, Potomac, Md.

[73] Assignee: The United States of America as represented by the Secretary of Commerce, Washington, D.C.

[21] Appl. No.: 360,963

[22] Filed: Dec. 21, 1994

[51] Int. Cl.⁶ .......................... F16C 11/04; F16M 11/14
[52] U.S. Cl. .......................... 403/128; 403/169; 403/217; 403/90; 403/161
[58] Field of Search ...................... 359/223, 224, 359/225, 226, 871; 52/648.1, 649.8, 651.01, 653.2; 33/503; 248/157; 403/123, 122, 128, 161, 162, 163, 90, 169, 170, 217

[56] References Cited

U.S. PATENT DOCUMENTS

| | | |
|---|---|---|
| 1,059,313 | 4/1913 | Perkins . |
| 2,260,283 | 10/1941 | Halford et al. . |
| 3,577,659 | 5/1971 | Kail . |
| 3,723,995 | 4/1973 | Baumann .............................. 403/128 X |
| 4,505,609 | 3/1985 | Vella ...................................... 403/170 X |
| 4,927,257 | 5/1990 | Enterline et al. . |
| 4,928,546 | 5/1990 | Walters . |
| 4,934,840 | 6/1990 | Paret . |
| 5,052,736 | 10/1991 | Loncaric et al. . |
| 5,088,852 | 2/1992 | Davister . |
| 5,179,525 | 1/1993 | Griffis et al. . |
| 5,247,749 | 9/1993 | Bury .......................................... 33/503 |
| 5,279,176 | 1/1994 | Tahmasebi et al. . |
| 5,301,566 | 4/1994 | Tahmasebi et al. . |
| 5,355,743 | 10/1994 | Tesar . |
| 5,461,515 | 10/1995 | Sorce .................................. 403/122 X |

FOREIGN PATENT DOCUMENTS

| | | | |
|---|---|---|---|
| 171634 | 6/1952 | Germany ............................... 403/161 |
| 604469 | 9/1978 | Switzerland ............................ 403/161 |
| 898142 | 1/1982 | U.S.S.R. ................................... 403/122 |
| 1583726 | 8/1990 | U.S.S.R. ...................................... 33/503 |
| 23701 | of 1907 | United Kingdom ...................... 403/163 |

Primary Examiner—Anthony Knight
Attorney, Agent, or Firm—Michael M. de Angeli

[57] ABSTRACT

A highly rigid structure is provided using six struts connected at three upper and three lower nodes to upper and lower support structures. The joint assemblies are formed by half-spherical balls attached to the ends of each of the struts, and retained within cylindrical apertures, such that the center lines of the struts intersect at the nodes. Bending loads on the struts are thus eliminated, while the design and construction of the structure is substantially simplified.

15 Claims, 7 Drawing Sheets

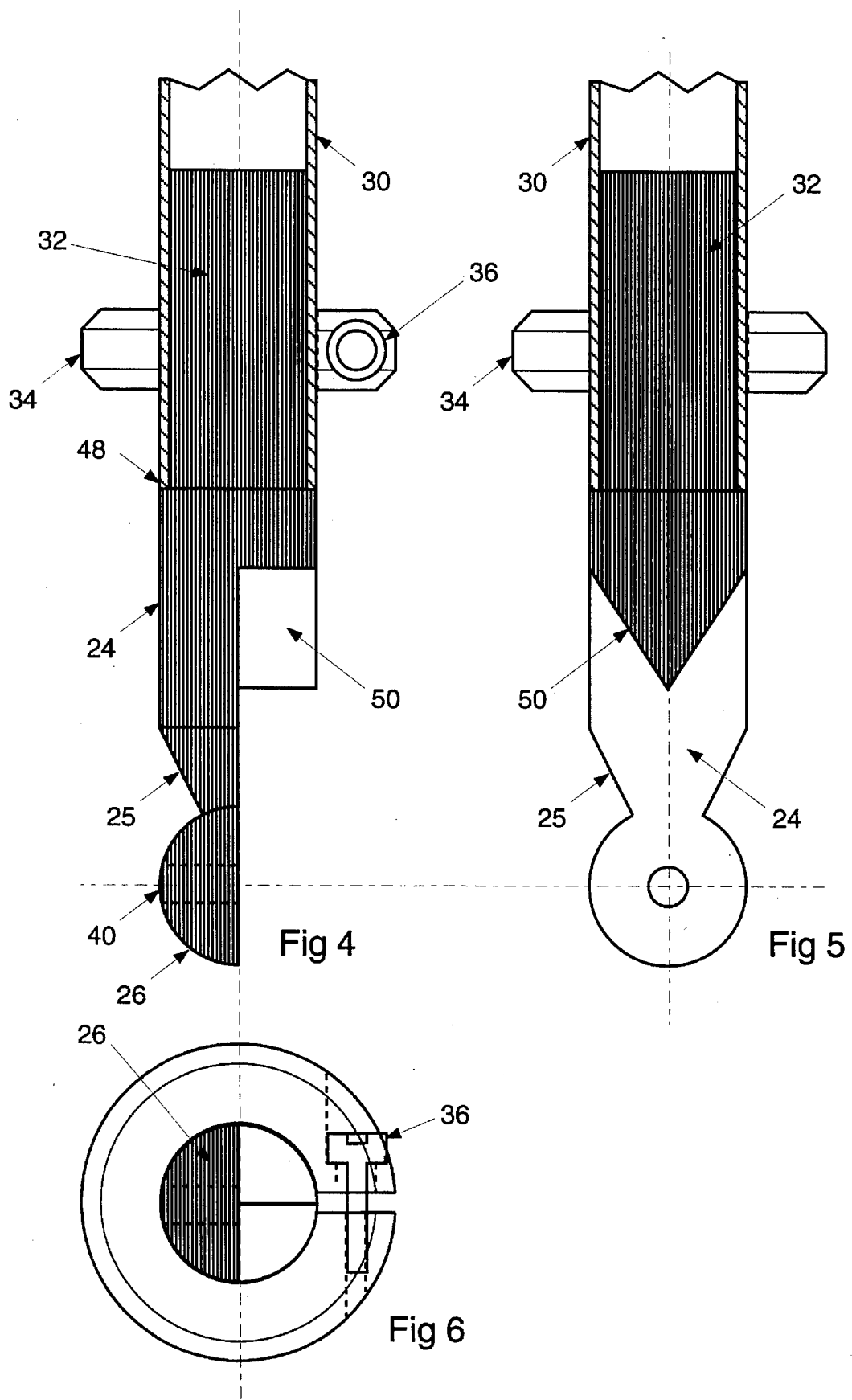

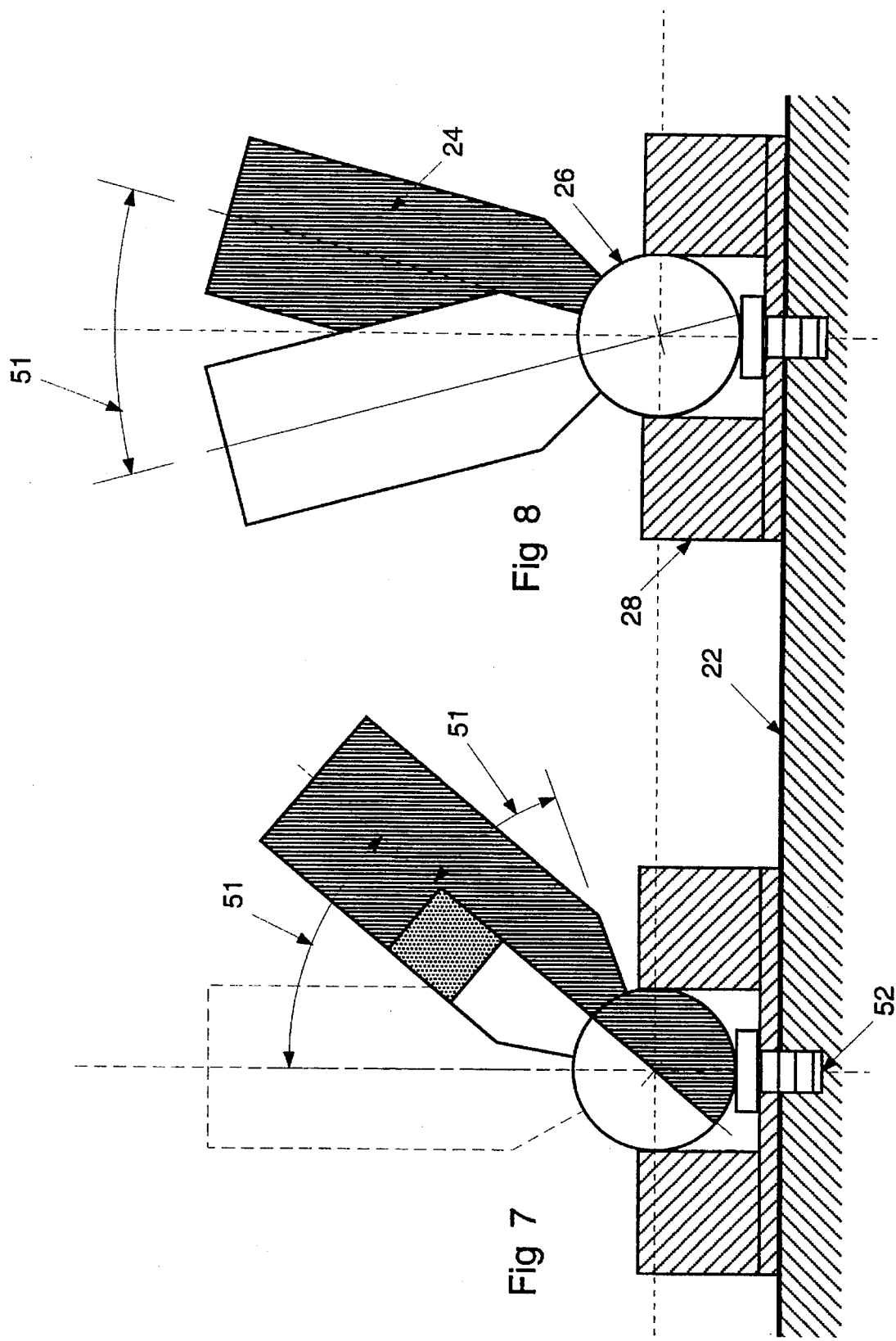

STRUT STRUCTURE AND RIGID JOINT THEREFOR

FIELD OF THE INVENTION

This invention relates generally to strut structures, for example, as used to support one component of a precision instrument or tool in precise relation to another component thereof or to a workpiece. More particularly, the invention relates to an improved joint assembly for such a strut structure and structures formed using this joint assembly.

BACKGROUND OF THE INVENTION

In many applications, for example throughout instrumentation, metrology and like precision disciplines, one element of an instrument or tool must be supported in precise relation to another element, or to a workpiece. For example, in microscopy, particularly as used for precision measurement of features of an object, the optical components of the microscope must be mounted in a stable and precisely defined relationship to the stage on which the object being examined is mounted. The invention relates to a structure for thus rigidly supporting one component of an instrument or tool to another component or to a workpiece. It would further be desirable if such a structure could be manufactured readily, avoiding casting and other complex manufacturing techniques, and if the structure consumed a minimal amount of space, so as to provide access to the equipment supported. Further advantages to be provided by such a structure would include ease of adjustability, ease of assembly and simplicity of design.

Conventional optical microscopes as used in inspection processes as described generally above typically comprise a heavy cast iron "C"-shaped structure, the microscope stage being mounted to the lower portion of the "C"-shaped structure, and the optical components of the microscope being mounted to the upper portion of the "C". Such heavy cast iron structures are very expensive to fabricate, and as increasing the mass of the structure is the only effective way of increasing its rigidity, increase substantially in weight and cost for any improvement in rigidity. Increasing the distance the stage and microscope are cantilevered out from the backbone of the "C" to improve access renders the overall structure more susceptible to vibration, requiring more material to provide adequate rigidity.

The prior art shows pin-connected truss or strut structures used to support one portion of a machine element or instrument with respect to a base. For example, see Kail U.S. Pat. No. 3,577,659 showing a three degree-of-freedom joint for attaching the upper end of linear actuators to a motion platform of a six degree-of-freedom motion system. More particularly, the Kail system provides a support structure for an aircraft cockpit simulator; the cockpit simulator is supported on six telescoping members, each pivotably joined to the support structure of the cockpit at one end and to support structure fixed with respect to the building floor at the opposite end. Each end of the Kail linear actuators is connected to its respective support structure by a ball joint such that the angles made by the actuators with respect to one another and the support structure can vary as the lengths of the actuators are varied. By controllably varying the length of the linear actuators, the cockpit simulator is provided with six degrees of freedom, allowing the simulation of a variety of rolling, pitching, and yawing motions as might be encountered in flight.

The Kail linear actuators are connected to the floor of the building and the cockpit simulator such that each pair of actuators and the support structure essentially forms a triangle; the resulting structure is relatively rigid. However, because the points at which the center lines of the actuators intersect the support structure are spaced from one another, a pivoted link is effectively introduced between two sides of each triangle. The rigidity of the structure is therefore significantly reduced. Moreover, bending loads are experienced by the actuators, rendering them more susceptible to vibration than would otherwise be the case. Furthermore, the Kail structure is relatively complex and thus costly to manufacture.

Davister U.S. Pat. No. 5,088,852 shows a pinned connector structure for connecting struts of a geodesic dome or the like at nodes. Depending on the precise alignment used, the struts of the Davister assembly could intersect at the center lines of the nodes. However, the structure shown in Davister is very complicated to fabricate, and does not provide a satisfactorily simple method for fixing the nodes with respect to a structure to be supported, a ground plane, or the like.

U.S. Pat. No. 4,934,840 to Paret shows a spherical bearing assembly wherein a number of ball bearings supporting a larger spherical bearing are contained within a sealed race.

Walters U.S. Pat. No. 4,928,546 shows a robotic device wherein a plurality of members approximating the fingers of one's hand are joined to sections of a sphere for allowing independent motion in a plane.

Halford et al U.S. Pat. No. 2,260,283 is generally of interest in showing a split ball and socket joint. U.S. Pat. No. 1,059,313 to Perkins shows a step bearing for machinery, wherein a ball is supported within a recess and used to support another member.

OBJECTS AND SUMMARY OF THE INVENTION

It is therefore an object of the invention to provide a joint assembly for a structure comprising struts connected at two or more sets of nodes, one set of nodes being fixed with respect to each component of the overall instrument structure or machine being constructed. The joint assembly formed at each node is such that the center lines of each pair of struts intersect at the centers of the nodes. Accordingly, no bending moments exist along the struts, that is, all loads are carried axially by the struts.

It is a further object of the invention to provide a structure whereby a first component of an instrument may be supported with respect to another component by a structure which provides a very high degree of rigidity in the connection and relation of the two components of the instrument, while consuming minimal space, allowing free access to the components of the assembly, and being relatively inexpensively manufacturable using readily available stock materials.

These and other objects of the invention appearing as the discussion below proceeds are satisfied by the present invention, wherein the struts of a strut-and-node structure are connected by joint assemblies. Each of the joint assemblies comprises two half-spherical balls, one of each of the half-spherical balls being connected to one of the two struts meeting at the node, such that the centerlines of the struts intersect at the nodes. The ends of the struts can thus rotate with respect to one another about a common axis, allowing the angular relationship of the struts to vary in assembly of a static structure, or during movement of a dynamic structure. The two halves of each spherical joint are received within a footer member, typically having a cylindrical recess therein for receiving the two halves of the spherical ball comprised by the two half-spherical portions of each joint assembly. In a static structure, the two halves of the ball of each joint may be clamped to one another, and/or to the footer member; the strut end members may also be clamped to the corresponding struts. In a dynamic structure, wherein the struts are of varying length, the two halves of the ball may rotate with respect to one another, with respect to the corresponding strut, and also with respect to the cylindrical recess within which they are received. In high load applications, the cylindrical recess may comprise a hydrodynamic or ball bearing assembly. The structure may be used to provide multiple stories of a tower, each stage typically comprising six struts connected at three nodes to the lower and upper structures.

BRIEF DESCRIPTION OF THE DRAWINGS

The invention will be better understood if reference is made to the accompanying drawings, in which:

FIGS. 4, 5, and 6 show side elevation, end elevation, and cross-sectional views through the half-spherical ball of each strut end member, respectively, according to the invention;

FIGS. 7 and 8 show side and end elevational views of the joints, respectively, in a static configuration;

DESCRIPTION OF THE PREFERRED EMBODIMENTS

Figure 1:
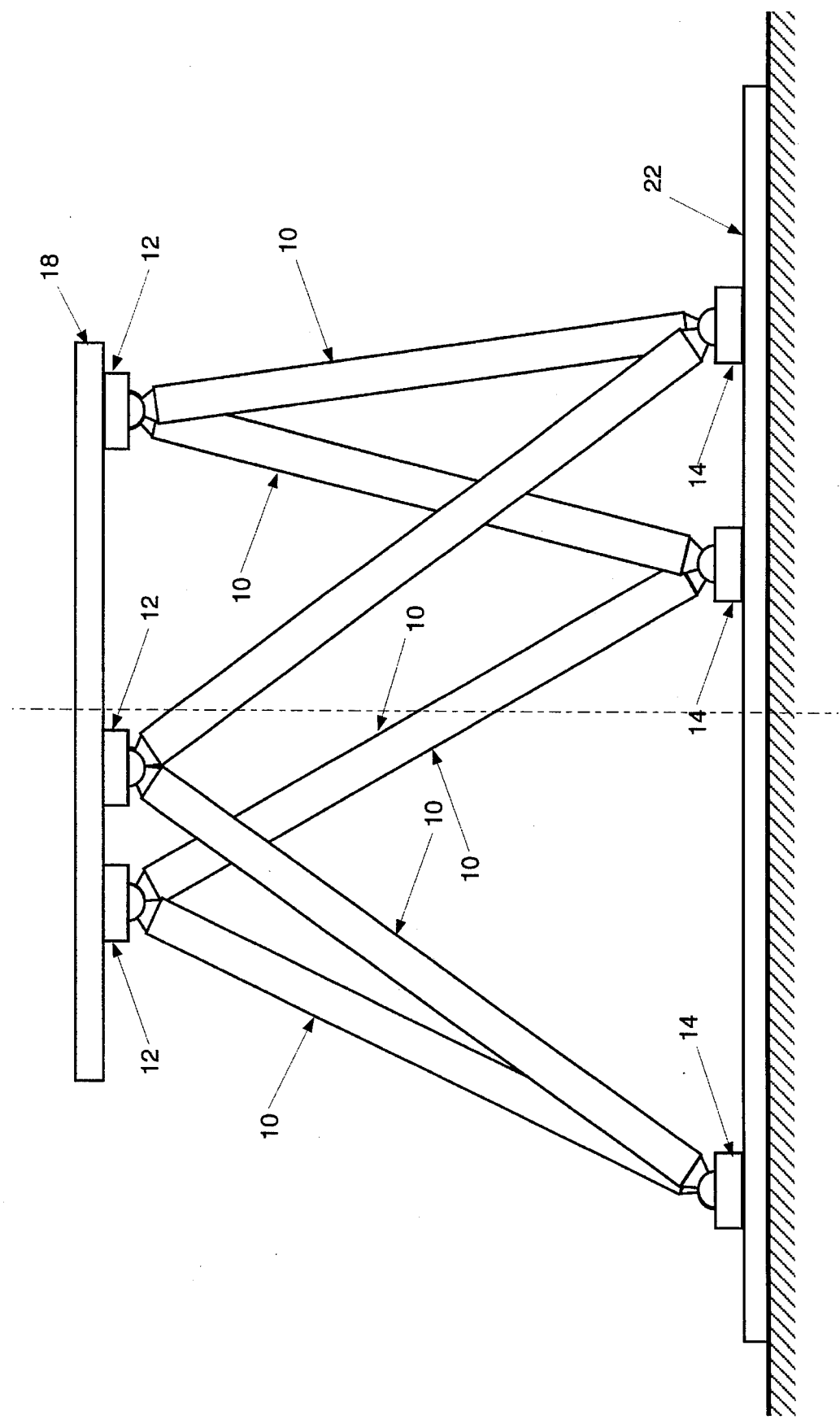
FIG. 1 shows an elevation view of the basic components of the structure of the invention.

FIG. 1 shows a basic structure according to the invention comprising six struts 10 joined to one another, forming pairs at three upper nodes 12 and three lower nodes 14. The upper nodes 12 are fixed with respect to an upper supported structure, such as a platform 18, and the lower nodes 14 are fixed with respect to a lower structure 22. As can be seen, each pair of struts 10 forms two sides of a triangle completed by the upper or lower structure, such that a fully triangulated, highly rigid assembly is made. A similar structure in terms of the number and arrangement of struts and nodes is shown by the Kail U.S. Pat. No. 3,577,659. According to the invention, however, each strut is joined to a corresponding strut by a joint assembly designed such that the center lines of the struts intersect at the node, eliminating the intermediate pinned link provided by Kail. The assembly according to the invention is thus much more rigid than that of Kail. Furthermore, according to this important aspect of the invention, there are no bending loads on the struts, and all loads on the struts due to the weight of the components are carried in compression. The joint assembly of the invention could also be used in arrangements where the struts are under tension. Rigid elongated members are far stiffer and stronger in tension or compression than in shear or bending, such that for a given mass of material of given characteristics, the structure of the invention is much more rigid and strong than the structure of Kail, wherein the struts do not intersect at the nodes.

Figure 2:
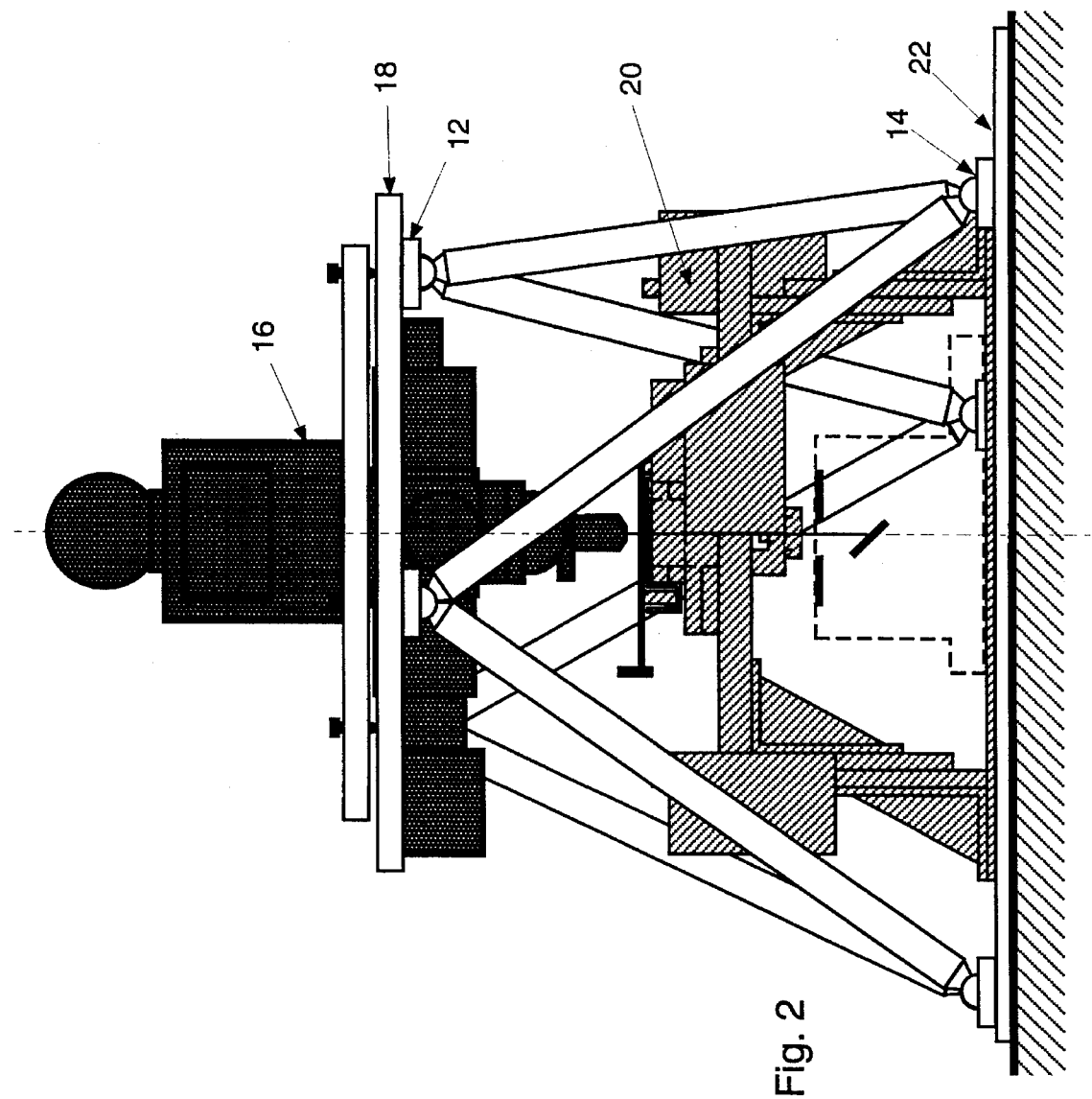
FIG. 2 shows a corresponding view of the invention as used to support two components of a microscope examination system.

FIG. 2 shows one example of use of the structure of the invention. In this case, a microscope indicated generally at 16 is supported on the upper support platform 18 to which the upper nodes 12 are fixed, while the stage 20 carrying the object being examined by the microscope is supported by the structure 22 to which the lower nodes 14 are fixed. As can be seen, a large working volume and good access to the components of the instrument between the upper and lower structures 18 and 22 are provided, particularly as compared to a large "C"-shaped cast iron member as used in many conventional microscope designs, which substantially restricts access to one side of both the optical components and the stage. Moreover, the structure of the invention is easier and less expensive to manufacture than is such a unitary "C"-shaped cast iron member or the like, and is much more rigid for a given weight of material.

Figure 3:
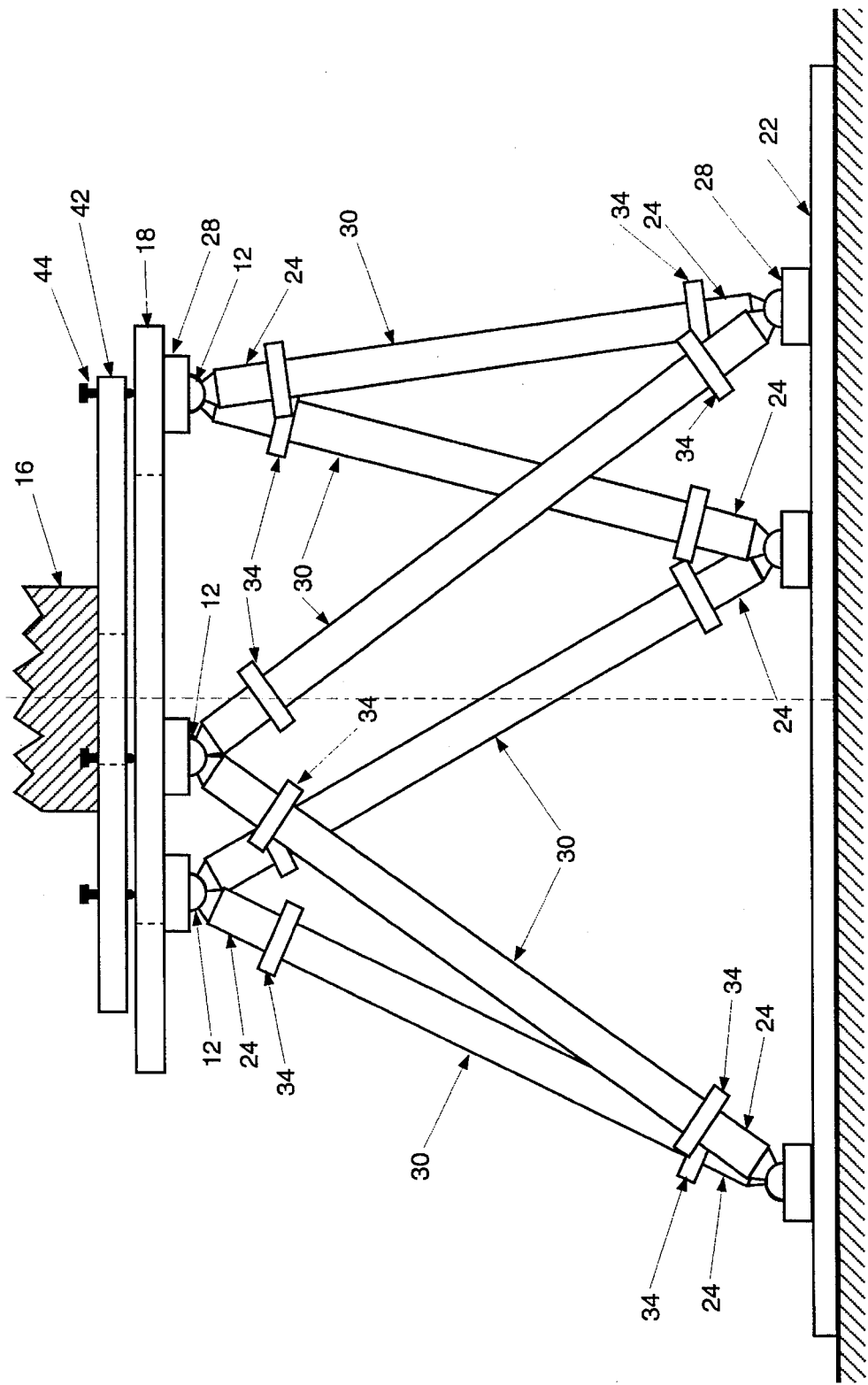
FIG. 3 shows a corresponding, more detailed view of a support structure according to the invention.

FIG. 3 shows a more detailed view of a static structure according to the invention. In this embodiment, each of the struts 30 is shown terminated by strut end members 24 shown in more detail in FIGS. 4, 5, and 6. As can there be seen, each strut end member 24 comprises a hemispherical or half-spherical ball end 26, that is, spherical on one side and terminating in a plane surface lying on the center line of the strut. When two such strut end members are placed together as indicated in FIG. 3, such that their planar surfaces are in contact with one another, the two half-spherical ball ends 26 form a substantially complete sphere, that is, complete except for the "neck" 25 by which each half-sphere is connected to the strut. In the structure of FIG. 3, the half-spherical ball ends are confined within cylindrical recesses provided by footer members 28 shown in further detail in FIGS. 7 and 8. Footer members 28 are fixed to the upper and lower support structures 18 and 22, thus defining the nodes at which the centerlines of the struts meet. Alternative constructions of the footer members are shown in FIGS. 9–12.

In the embodiment shown in FIGS. 4–6, the body 30 of each strut 10 comprises thin-wall tubing, split as necessary for clamping, to fit over shank portions 32 of the strut end members 24 having a shoulder 48 against which the end of the tube abuts, and clamped thereto by split-ring clamps 34 tightened thereover by screws 36. It may also be desirable to pin the two halves of each spherical ball together by a pin or screw fitting through an aperture 40 through the center of each of the spherical ball halves, perpendicular to the center line of the struts, but this is not necessary in every embodiment.

As indicated further in FIG. 3, the microscope 16, or other component of an instrument or tool, may be supported kinematically with respect to the upper support member 18 on a separate planar support plate 42 provided with fine adjustment for height by set screws 44 fitting into radial grooves located above the nodes 12 at which the struts support the upper support member 18. In this way, any minor adjustments for the alignment of the microscope 16 with respect to other structure can be made by adjusting set screws 44. More particularly, the inventive joint assembly ensures that the centerlines of the struts will meet at the nodes defined by the footer members 28, so that the precise angles at which the struts meet are not required to be determined. However, any variation in the effective overall lengths of the struts 10, or any error in positioning of the footer members 28, will result in lack of parallelism of the upper support plate 18 with respect to the lower support plate 22; any such errors can be compensated for by adjustment screws 44.

If a dynamic structure is needed, wherein the orientation of the upper support plate is to be varied with respect to the lower plate, the length of the struts can be controllably variable, e.g., by forming the struts as hydraulic members, powered lead screw devices, or the like, such that the orientation of the upper and lower structural members can be controlled. In this case, the two halves of the ball ends 24 are not fixed to one another, and are not clamped to the body of the struts, nor clamped within the cylindrical footer members 28, as their relative angles will change as the lengths of the struts are varied.

Returning to the discussion of the strut end structure 24 shown in FIGS. 4–6, the full-diameter portion of the strut end 24 is machined to form a frustoconical neck 25, and a "V"-shaped relief 50 is provided, allowing the mating strut ends to approach closely to one another. Ill a successfully tested static structure formed according to the invention, the strut end members 24 may be machined of aluminum bar stock and the bodies of the struts may be formed of thin wall aluminum tubing. The clamps 34 and footer members 28 may also be formed of aluminum bar stock machined as necessary to receive the struts and spherical ball members. Of course, other materials could be substituted as necessary, for example, if wear were likely to be a factor.

FIGS. 7 and 8 show the manner in which the spherical balls are received within the footer members 28, and shows that the orientation of the struts with respect to the vertical, and with respect to one another, may vary over a wide angular range indicated by arrows 51. FIGS. 7 and 8 also illustrate that the footer members 28 may be secured to the support structure 22 by a single screw 52 received in a threaded hole in the baseplate. The same design may be used for the upper nodes. As indicated, the footer members 28 may be conveniently made as cylindrical members having cylindrical recesses therein for receiving the two spherical ball halves 26. Footer members 28 may be split and clamped essentially as illustrated by the strut clamps 34 where the structure is to be static after assembly.

Figure 10:
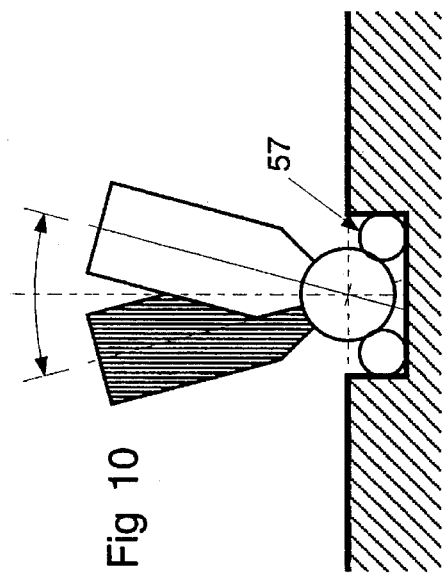
FIGS. 9–12 show alternative node structures for use in static and dynamic applications.
Figure 12:
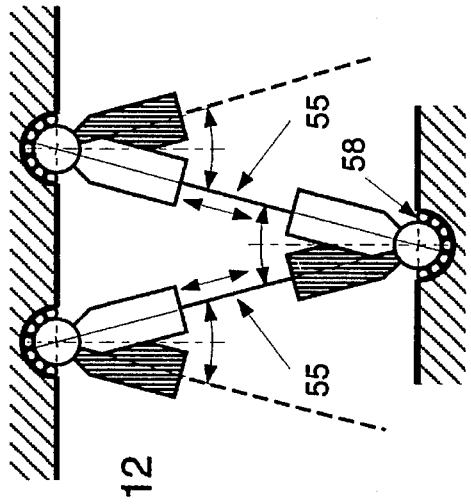
Figure 9:
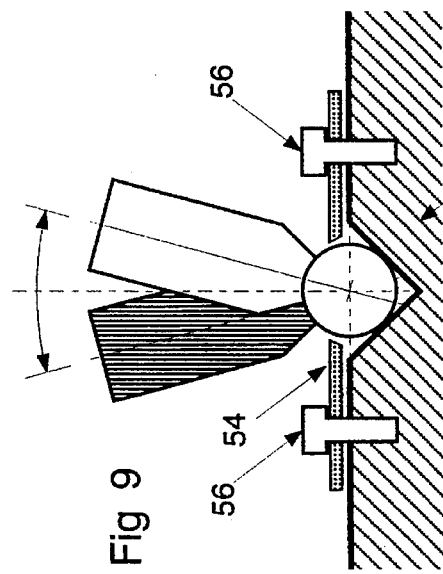
Figure 11:
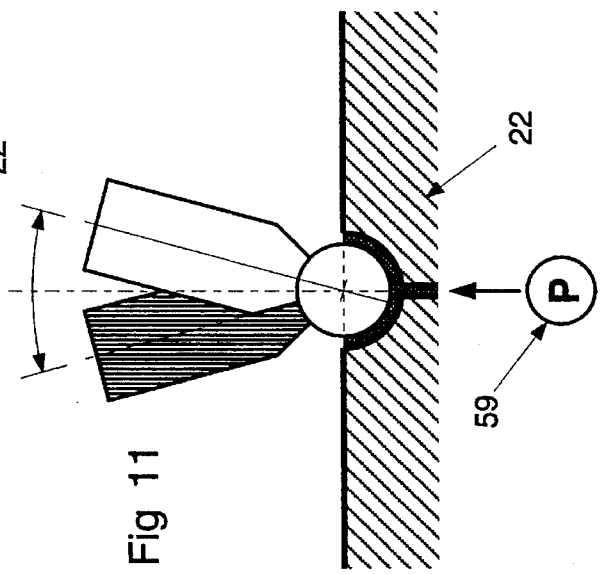

FIGS. 9–12 show alternative footer structures; the footer structures of FIGS. 9 and 10 are particularly intended for static structures, and those of FIGS. 11 and 12 for supporting the ball ends where the structure is desired to be dynamic, i.e., where the relative positions of the upper and lower structures may be varied by variation of the lengths of the struts, as indicated at 55 (FIG. 12). In each case, the footer structures define a circular periphery constraining the two half-spherical ball ends to remain in contact with one another. In the FIG. 9 embodiment, the balls may be confined within a frusto-conical recess in the baseplate 22 by a cover member 54 held thereto by screws 56. FIG. 10 shows a 'static kinematic' design, i.e., where free movement is necessary in assembly and adjustment of a structure thereafter static, incorporating three balls 57 (only two are shown in the drawings) in a cylindrical recess. In FIG. 11, a hydrostatic bearing may be formed by a pressurized film of oil supplied to an aperture in the lower portion of a spherical recess in the footer 22 by a pump illustrated generally at 59; such hydrostatic bearings are generally known in the art for applications where large moving masses must be supported but the speed of motion is not very great. FIG. 12 illustrates an alternative ball bearing support structure 58 which may be useful where the speed of motion may be somewhat more rapid and the ultimate load to be carried somewhat less. These structures may also be pressure lubricated as indicated in connection with FIG. 11, if necessary. Bearings allowing free rotation of the strut end members with respect to the bodies of the struts and bearings between the mating planar surfaces of the half-spherical balls of each strut end member are also necessary in a dynamic structure.

Figure 13:
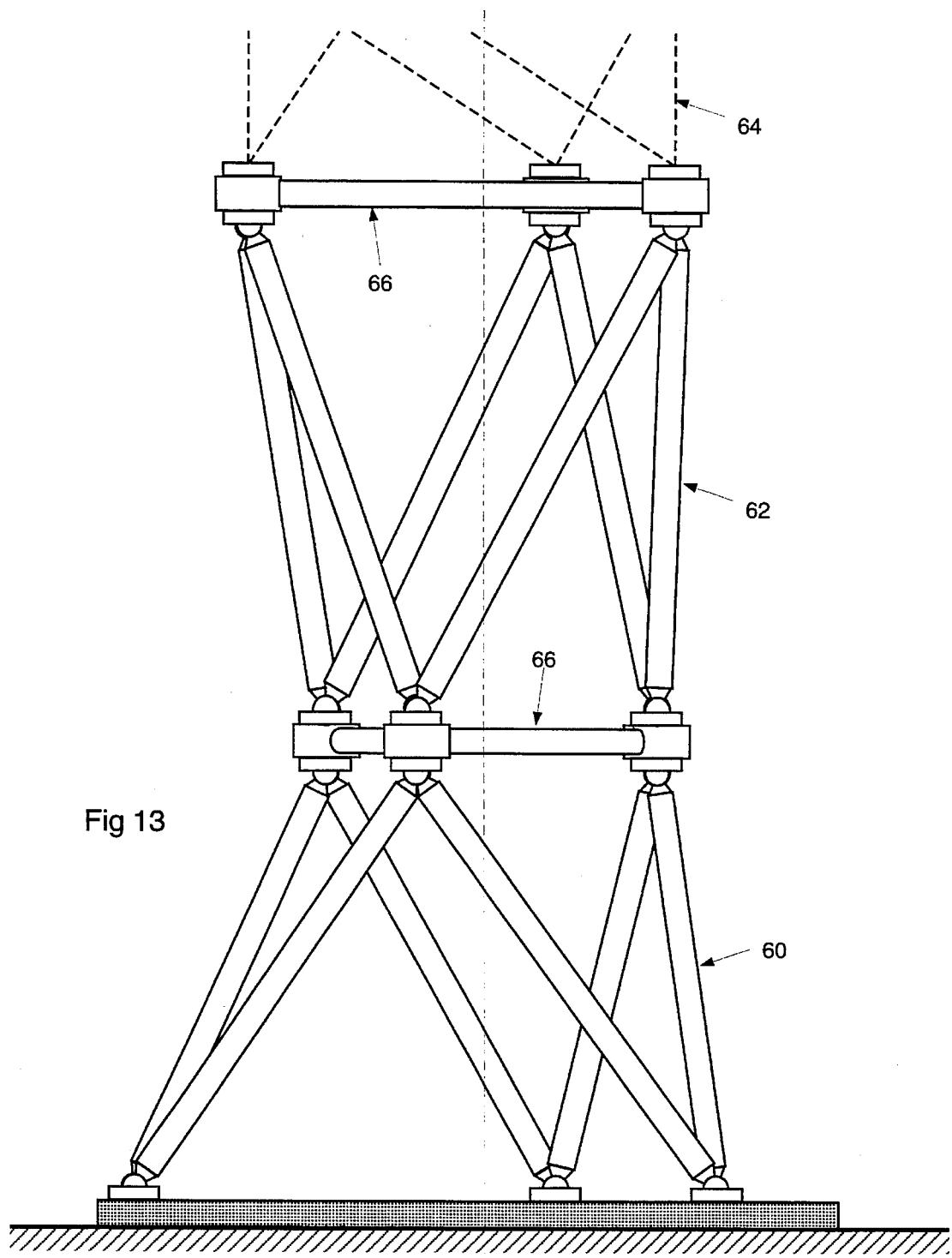
FIG. 13 shows a multiple-story version of the structure according to the invention.

Finally, FIG. 13 shows a multiple-story structure according to the invention wherein a first assembly 60 comprising six struts attached to three upper nodes and three lower nodes as discussed above supports a second similar structure 62 and possibly a third similar structure or more as indicated generally at 64. In each case according to the invention, the center lines of the struts meet at the upper and lower nodes, such that no bending loads are experienced by the struts, and providing a very rigid and strong structure at minimum weight and at minimum complexity of manufacture and assembly.

The structure of the invention having thus been discussed in detail, certain advantages provided thereby can now be more clearly brought out. According to the invention, an inherently rigid kinematic truss structure is realized by providing a joint assembly whereby the center lines of the struts intersect at the nodes. This eliminates bending or shear stresses in the structural elements; all loading is taken in compression, such that the inherent material stiffness is optimally employed. The joint assembly of the invention may also be useful in tension structures, again to optimize the transmission of loads at nodes where struts meet. In the tower structure of FIG. 13, the footers might comprise clamps joining two pairs of strut end members together at each node with a triangular strut structure 66 joining these footers to one another, effectively replacing the support members 18 and 22.

According to the invention, the geometry of the structure, i.e., the relationship of the upper and lower support members, is determined only by the lengths of the struts and positions of the nodes; the angles between the struts are not constrained, vastly simplifying fabrication and assembly. For example, struts can be joined along their center lines by welding, but only if they are supported in precisely their designed relationship during the welding process; moreover, further changes cannot be made conveniently. Bolted or riveted assemblies cannot easily accommodate the requirements of intersecting strut center lines affixed to the nodes. Moreover, according to the invention, the lengths of the struts can be changed, either automatically, or as necessary for adjustment, without reengineering or altering the joints in any way; the only constraint is that any clamps fixing the two halves of the balls of each joint to one another, and the clamps joining the strut center members to the strut end members, need be loosened to permit the lengths of the struts or the positions of the footers to be changed.

In addition to the advantages of the structure according to the invention listed above, the design is easily scalable to small or large structures; the working volume confined between the upper and lower support structures is relatively large and readily accessible, and is not limited by a "C"-shaped support structure, e.g., as typically used in microscopes; the top and bottom plates need not be parallel; and the struts need not be equally spaced to provide good access to the working volume. Finally, and very significantly, a very rigid structure is provided wherein the resonant frequency of the structure is very high; in particular, the predominant vibration modes of the struts are perpendicular to their lengths, and hence are not efficiently communicated to the upper and lower structures. The struts may also be damped internally if necessary, for example, by filling them with sand or the like.

While several preferred embodiments of the invention have been disclosed and described in detail, the invention should not be limited thereby, but only by the following claims.

What is claimed is:

1. A joint assembly for transmitting axial loads from two elongated struts meeting at a node to a supporting member, comprising:

two strut end members, one connected to each of the struts, for receiving axial loads from the corresponding strut, each strut end member comprising a half-spherical ball having a planar surface for contacting the planar surface of the other of said balls, such that an assembly of said two strut end members defines a substantially complete sphere, the centerlines of said elongated struts intersecting at the center of said substantially complete sphere, and means fixed with respect to said supporting member and defining a recess having a circular periphery, for receiving and retaining said substantially complete sphere defined by said assembly of said two strut end members.

2. The joint assembly of claim 1, wherein said means fixed with respect to said supporting member defines a cylindrical recess for receiving and retaining said substantially complete sphere defined by the assembly of said two strut end members.

3. The joint assembly of claim 2, further comprising means for clamping said substantially complete sphere at a fixed position within said cylindrical recess, such that a static structure may be assembled of a plurality of said joint assemblies and a like plurality of struts.

4. The joint assembly of claim 1, wherein said means fixed with respect to said supporting member comprises bearing means defining said recess having a circular periphery for receiving said substantially complete sphere defined by the assembly of said two strut end members, such that a dynamic structure may be assembled of a plurality of said joint assemblies and a like plurality of struts of controllably variable length.

5. The joint assembly of claim 1, wherein said planar surfaces of said half-spherical balls are oriented to include the axes of the corresponding struts.

6. A support structure for supporting a first component of a complete assembly with respect to a second component thereof, comprising at least twelve strut end members, and at least six struts each having one of said strut end members affixed to either end thereof for receiving axial loads from the corresponding strut, each strut end member comprising a half-spherical ball having a planar surface for contacting the planar surface of the other of said balls, such that an assembly of said two strut end members defines a substantially complete sphere, the centerlines of said elongated struts intersecting at the center of said substantially complete sphere, and six members defining recesses having a circular periphery for receiving and retaining the substantially complete spheres defined by six assemblies of pairs of said strut end members, three of said members for receiving being fixed with respect to said first component of a complete assembly, and the remaining three of said members for receiving being fixed with respect to said second component of said complete assembly.

7. The support structure of claim 6, wherein each of said members for receiving comprises clamp means, for fixing the orientation of the substantially complete spherical assemblies thereto, and thereby defining a rigid structure.

8. The support structure of claim 6, wherein each of said members for receiving comprises bearing means, permitting variation of the orientation of the substantially complete spherical assemblies with respect to one another, and wherein the lengths of said struts are controllably variable, thereby defining a dynamic structure.

9. The support structure of claim 6, wherein said planar surfaces of said half-spherical balls are oriented to include the axes of the corresponding struts.

10. A structure for defining the relative positions of first and second components of an assembly, comprising:

first and second groups of node members, at least three of said node members being fixed to each of said first and second components, each of said node members defining a recess defining a circular periphery adapted to receive and retain a spherical ball formed by assembly of a pair of strut end members;

a number of elongated struts equal to the number of node members; and first and second strut end members affixed to the ends of each strut;

wherein each of said strut end members comprises a half-spherical element defining a flat surface for contacting the corresponding flat surface of a mating half-spherical element, such that a substantially complete spherical ball is formed upon the assembly of two said half-spherical elements within said node members, and such that the axes of said elongated struts intersect at the nodes defined by said node members.

11. The structure of claim 10, wherein said node members define cylindrical apertures for receiving assemblies of said half-spherical elements.

12. The structure of claim 10, wherein said node members comprises clamping means for fixing the relationship of said struts to one another, defining a rigid structure.

13. The structure of claim 10, wherein said node members comprise bearing means for permitting variation of the relationship of said struts to one another, defining a dynamic structure.

14. The structure of claim 13, wherein the length of said struts is controllably variable, permitting variation of the relationship of said first and second components of the assembly.

15. The structure of claim 10, wherein said planar surfaces of said half-spherical balls are oriented to include the axes of the corresponding struts.

* * * * *